United States Patent [19]

Short, III

[11] Patent Number: 4,657,157

[45] Date of Patent: Apr. 14, 1987

[54] PRESSURE RELIEF METHOD AND RUPTURE DISK ASSEMBLY

[75] Inventor: Edward H. Short, III, Tulsa, Okla.

[73] Assignee: BS&B Safety Systems, Inc., Tulsa, Okla.

[21] Appl. No.: 875,981

[22] Filed: Jun. 19, 1986

[51] Int. Cl.$^4$ ................ F16K 17/40; B65D 25/00
[52] U.S. Cl. ................................. 220/89 A; 137/68.1
[58] Field of Search .................... 220/89 A; 137/68.1

[56] References Cited

U.S. PATENT DOCUMENTS

| 3,091,359 | 5/1963 | Wood | 220/89 |
|---|---|---|---|
| 3,698,598 | 10/1972 | Wood | 220/89 A |
| 4,079,854 | 3/1978 | Shaw et al. | 220/89 A |
| 4,119,236 | 10/1978 | Shaw et al. | 220/89 A |
| 4,278,181 | 7/1981 | Wood et al. | 220/89 A |
| 4,301,938 | 11/1981 | Wood et al. | 220/89 A |
| 4,434,905 | 3/1984 | Ou et al. | 220/89 A |
| 4,479,587 | 10/1984 | Mundt et al. | 220/89 A |
| 4,580,691 | 4/1986 | Hansen | 220/89 A |

Primary Examiner—Steven M. Pollard
Attorney, Agent, or Firm—Laney, Dougherty, Hessin & Beavers

[57] ABSTRACT

The present invention relates to a method and assembly for relieving positive and/or negative pressure differentials between first and second fluid pressure zones. The rupture disk assembly is comprised of a flexible sealing member, a retainer means positioned on one side of the sealing member for engagement with and retention of the sealing member until disengaged therefrom when a predetermined negative pressure differential is exerted across the sealing member, and knife means for severing the sealing member spaced therefrom whereby the sealing member is prevented from contacting the knife means until disengaged from the retainer means.

29 Claims, 9 Drawing Figures

PRESSURE RELIEF METHOD AND RUPTURE DISK ASSEMBLY

BACKGROUND OF THE INVENTION

1. Field of the Invention

The present invention relates generally to a pressure relief method and apparatus, and more particularly, but not by way of limitation, to a method and rupture disk assembly for relieving predetermined positive pressure differential in one direction and/or predetermined negative pressure differential in the opposite direction.

2. Description of the Prior Art

A variety of pressure relief methods and devices of the rupture disk type have been developed and utilized heretofore. Generally, the devices include a rupture disk supported between a pair of complementary support members or flanges which are in turn connected to a relief connection in a vessel or system containing fluid pressure. When the fluid pressure within the vessel or system exceeds the predetermined design pressure of the rupture disk, rupture occurs allowing fluid pressure to be relieved unidirectionally from the vessel or system to the atmosphere or to another vessel or system.

Bidirectional pressure relief methods and rupture disk assemblies have also been developed and utilized heretofore, see, e.g., U.S. Pat. Nos. 3,091,359 to Wood, 4,079,854 to Shaw et al., 4,301,938 to Wood et al., 4,479,587 to Mundt et al. Such bidirectional rupture disk assemblies generally have included a flexible sealing member positioned adjacent a perforated rupture member so that when a predetermined positive pressure differential is exerted across the sealing member and rupture member, the rupture member ruptures causing the sealing member to also rupture and pressure to be relieved through the assembly. When a negative pressure differential is exerted on the sealing member by way of the perforations in the rupture member, the sealing member is caused to contact knife means positioned in the assembly adjacent thereto whereby the sealing member is severed and the negative pressure differential relieved. The term "positive pressure differential" is used hereinafter to mean a pressure differential exerted between first and second zones across a rupture disk assembly whereby the pressure in the first zone is above atmospheric pressure and is significantly higher than the pressure in the second zone. The term "negative pressure differential" is utilized hereinafter to mean a pressure differential exerted across the rupture disk assembly in the opposite direction, i.e., from the second zone to the first zone. While a negative pressure differential can occur as a result of the pressure in the second zone being above atmospheric pressure and being significantly higher than an above atmospheric pressure existing within the second zone, more typically such negative pressure differential is a result of a vacuum in the first zone and atmospheric or slightly higher pressure in the second zone.

While the prior bidirectional methods and apparatus have been utilized successfully, problems have been encountered in applications where negative pressure differential relief is required at very low specific levels. An example of such an application is a pressure vessel which normally operates under considerable internal pressure and requires positive pressure differential relief at a normal level, but which requires negative pressure differential relief at a very low level, e.g., when a vacuum occurs within the vessel whereby the negative pressure differential is between four inches and nine inches of water column with no opening occurring until the negative pressure differential exceeds four inches of water column. In such applications, prior methods and apparatus have often allowed the piercing and failure of the sealing member prior to when the negative pressure differential at which failure is supposed to occur is reached. This in turn, causes needless frequent shutdowns and replacements.

By the present invention, an improved method and rupture disk assembly are provided which obviate the problem described above as well as other problems associated with prior methods and devices.

SUMMARY OF THE INVENTION

A rupture disk assembly is provided which is adapted to be clamped in a pressure relief area for relieving fluid pressure at predetermined positive and/or negative pressure differentials. The assembly is comprised of a flexible sealing member and a retainer means positioned on one side of the sealing member for engagement with and retention of the sealing member until disengaged therefrom when a predetermined negative pressure differential is exerted across the sealing member. Knife means for severing the sealing member are positioned adjacent the side of the sealing member opposite the retainer means and are spaced from the sealing member whereby the sealing member is prevented from contacting the knife means until the connector is disengaged from the retainer means.

When positive pressure differential as well as negative pressure differential is to be relieved by the assembly, a perforated rupture member is positioned adjacent the side of the sealing member on which the retainer means is positioned for rupture when a predetermined positive pressure differential is exerted thereacross and across the sealing member.

A method for relieving predetermined positive and/or negative pressure differentials between first and second zones utilizing a rupture disk assembly is also provided.

It is, therefore, a general object of the present invention to provide a pressure relief method and rupture disk assembly for accurately and reliably relieving fluid pressure at predetermined positive and/or negative pressure differentials.

Another object of the present invention is the provision of a pressure relief method and rupture disk assembly capable of accurately and reliably opening at a specific very low negative pressure differential.

A further object of the present invention is the provision of a pressure relief method and rupture disk assembly whereby when the predetermined low negative pressure differential at which pressure relief is to occur is reached, full pressure relief occurs.

Yet a further object of the present invention is the provision of a rupture disk assembly which is easily cleaned in place.

Other and further objects, features and advantages of the present invention will be readily apparent to those skilled in the art upon a reading of the description of preferred embodiments which follows when taken in conjunction with the accompany drawings.

BRIEF DESCRIPTION OF THE DRAWINGS

FIG. 6 is an enlarged view of a portion of the apparatus shown in FIG. 1.

DESCRIPTION OF PREFERRED EMBODIMENTS

Figure 1:
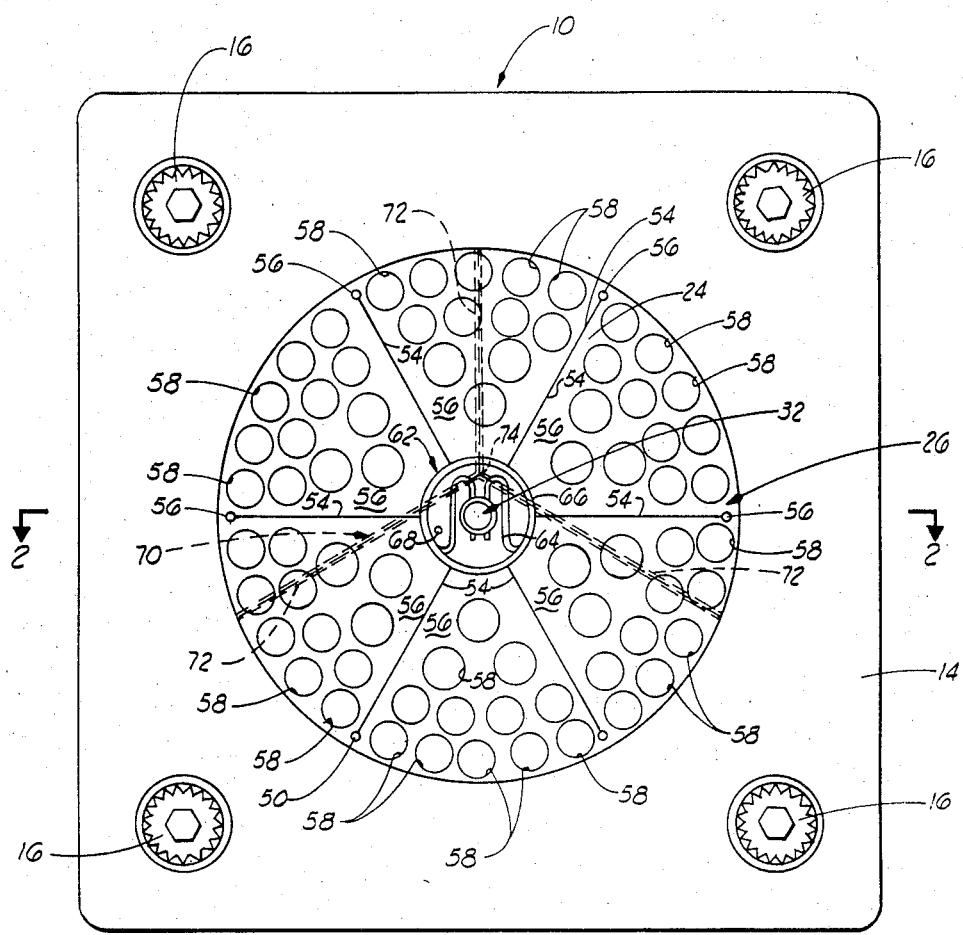
FIG. 1 is a top plan view of a bidirectional rupture disk assembly of the present invention.
Figure 2:
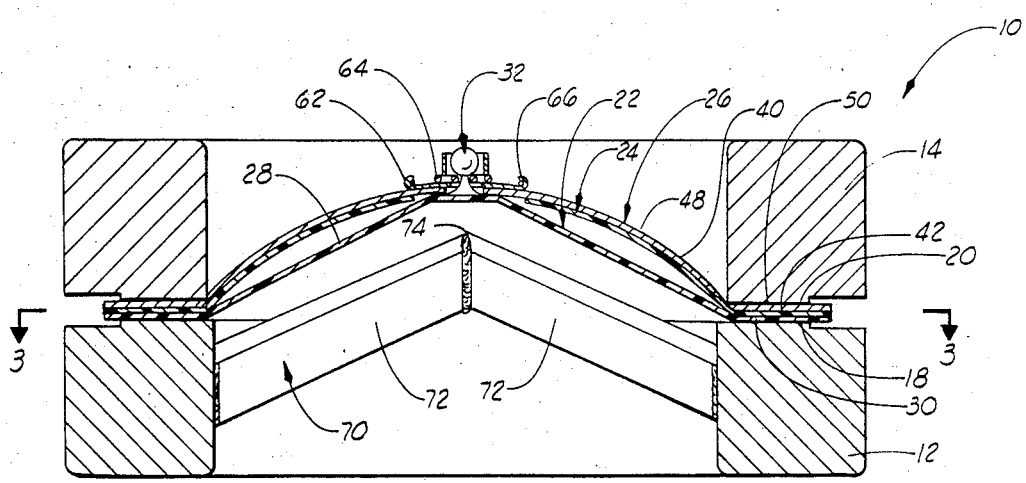
FIG. 2 is a cross-sectional view taken along line 2—2 of FIG. 1.
Figure 3:
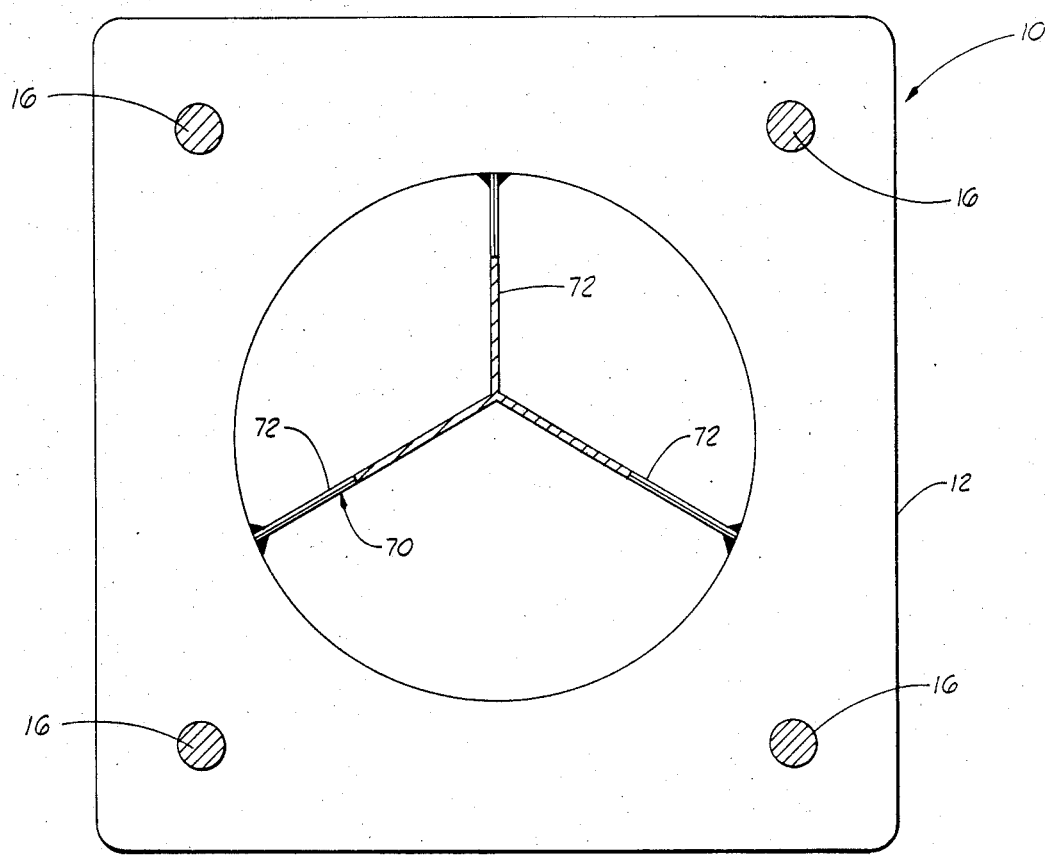
FIG. 3 is a cross-sectional view taken along line 3—3 of FIG. 2.

Referring now to the drawings and particularly FIGS. 1-4, a bidirectional rupture disk assembly of the present invention is illustrated and generally designated by the numeral 10. The apparatus 10 is comprised of a pair of complementary support members 12 and 14 which are held together by a plurality of bolts 16. The heads of the bolts 16 are preferably recessed in the support member 14 and the threaded portions of the bolts extend into threaded openings in the support member 12 (not shown). In the embodiment illustrated in the drawings, the support members 12 and 14 are of square peripheral shape, but as will be understood by those skilled in the art, other peripheral shapes can be utilized.

Figure 7:
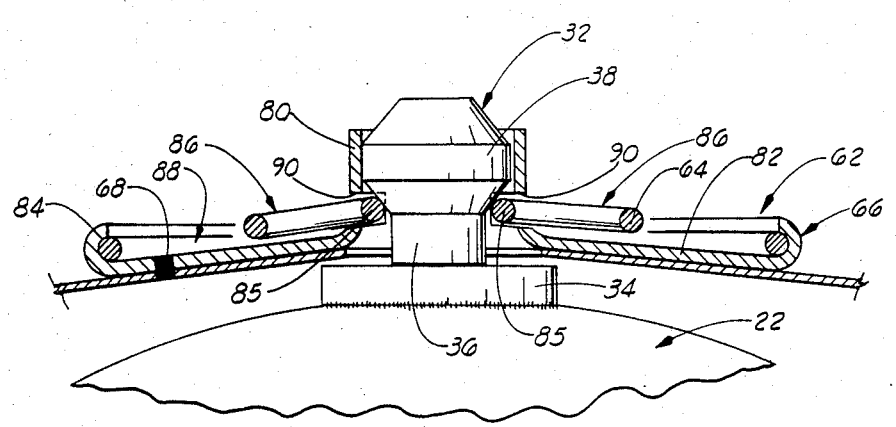
FIG. 7 is an enlarged view of a portion of the apparatus shown in FIG. 2.
Figure 8:
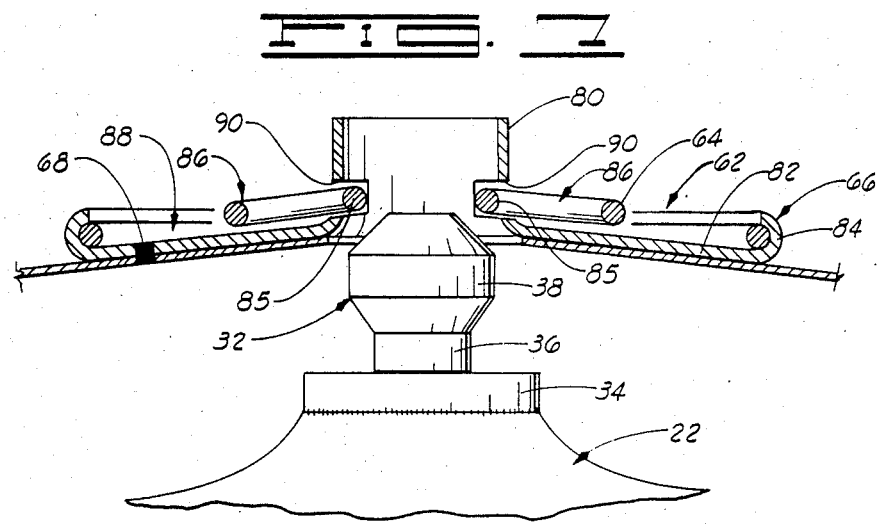
FIG. 8 is an enlarged view similar to FIG. 7 but showing the apparatus after partial operation.

The support members 12 and 14 provide opposing flat annular seating surfaces 18 and 20 between which a flexible sealing member 22, a perforated protection member 24 and a perforated rupture member 26 are clamped. More specifically, and as shown best in FIG. 4, the flexible sealing member 22 is circular in peripheral shape and includes a dome-shaped portion 28 connected to an annular flat flange portion 30. The sealing member 22 is preferably formed of a flexible plastic material, and a connector or button 32 is attached to the dome-shaped portion 28 thereof at a point at or near the center thereof. The button 32 can take various forms, but in the form illustrated and as shown in FIGS. 7 and 8, it includes a base 34 which is adhered or otherwise attached to the flexible sealing member 22, an upstanding small diameter post 36 connected to the base 34 and an enlarged knob 38 formed at the upper end of the post 36.

Referring again to FIG. 4, the protection member 24 also includes a dome-shaped portion 40 connected to an annular flat flange portion 42, and is preferably also formed of a flexible plastic material. The dome-shaped portion 40 includes a central circular opening 44 and a plurality of slits 46 formed therein which radiate outwardly from the opening 44 and terminate in spaced relationship to the periphery of the dome-shaped portion 40.

Like the sealing member 22 and protection member 24, the rupture member 26 also includes a dome-shaped portion 48 connected to an annular flat flange portion 50. Spaced apertures 52 are disposed in the dome-shaped portion 48 around a central portion thereof which are connected to a plurality of slits 54. The slits 54 radiate outwardly from the apertures 52 and terminate in additional apertures 56 positioned in spaced relation to the periphery of the dome-shaped portion 48. The apertures 52 and 56 and slits 54 connected therebetween define and divide the dome-shaped portion 48 of the rupture member 26 into sectors 56, each of which includes a plurality of openings 58 disposed therein.

Figure 5:
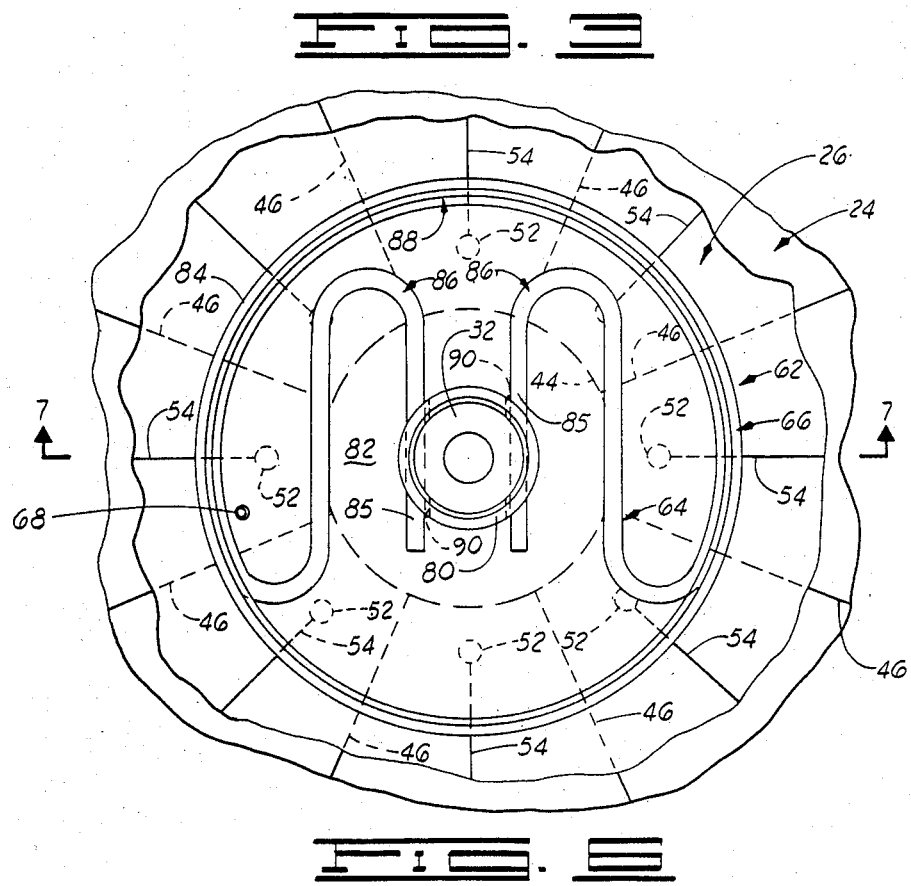
FIG. 5 is a cross-sectional view similar to FIG. 2 but showing the assembly after rupture as a result of positive pressure differential.
Figure 4:
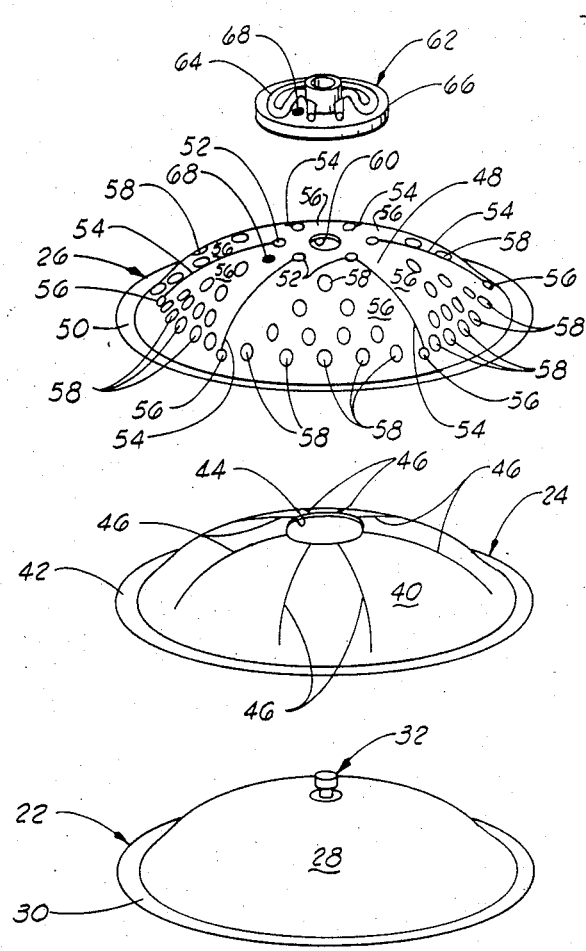
FIG. 4 is a perspective view of some of the parts of the assembly of FIGS. 1-3.
Figure 5:
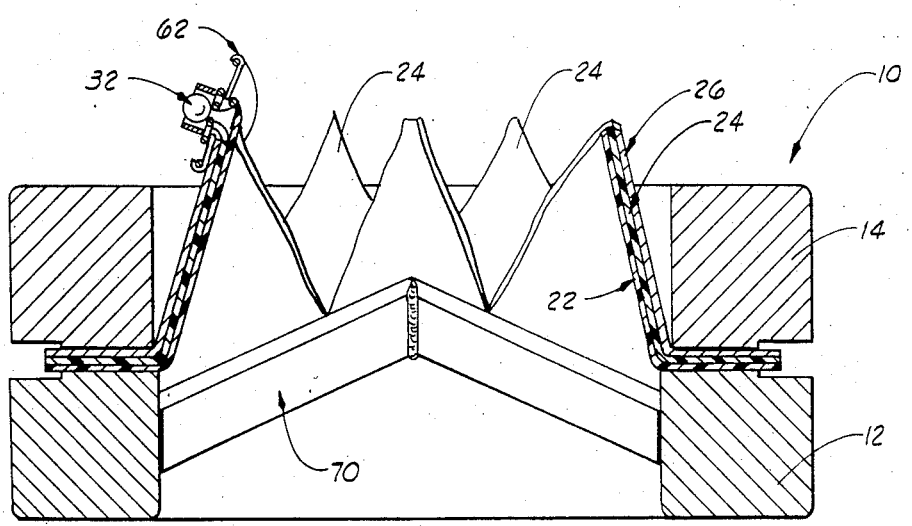

An opening 60 is provided at or near the center of the dome-shaped portion 48 of the rupture member 26, and positioned over the center opening 60 and attached to the rupture member 26 is a button retainer 62. The button retainer 62 can take various forms, but preferably is a spring clip retainer comprised of a spring 64 and base member 66. The base member 66 is attached to the dome-shaped portion 48 of the rupture member 26 at a single point within one of the sectors 56 such as by a spot weld 68 so that upon rupture of the rupture member 26 between the apertures 52, the sectors defined by the slits 64 are free to bend upwardly with the button retainer 62 remaining attached to one of the sectors as illustrated in FIG. 5.

As is well understood by those skilled in the art, the assembly 10 is assembled whereby the slits 46 of the protection member 24 are offset from the slits 54 of the rupture member 26, and whereby the protection member 24 is positioned between the sealing member 22 and rupture member 26 in covering relationship to the slits 54, apertures 52, apertures 56 and openings 58 to the rupture member 26. The protection member 24 protects the sealing member 22 from premature failure due to abrasion and cutting on the edges of the slits, apertures and openings. The protection member 24 does not provide resistance to the rupture of the assembly 10 in either direction since the sectors defined by the opening 44 and slits 46 are not connected together.

Referring again to FIGS. 1-3, the assembly 10 includes a knife blade structure 70 connected to the support member 12 for severing the sealing member 22 when contacted thereby. The knife blade structure can take various forms, and can be an independent component in the assembly 10 which is not attached to a support member. Also, the support members 12 and 14 can be entirely eliminated with the various other components including a knife means being clamped between conventional pipe flanges or the like.

In the embodiment disclosed, which is presently preferred, the knife blade structure is comprised of three radially extending blade members 72, the inner ends of which are connected together at a pinnacle 74 with the outer ends being attached to the support ring 12. The knife blade structure 70 is spaced from the sealing member 22 whereby the sealing member is prevented from contacting the knife blades when the retaining button 32 is engaged with the button retainer 62. Further, as best shown in FIG. 1, the apex 74 of the knife blade structure 70 is offset from the button 32 whereby upon the severance of the sealing member 22 by the knife blade structure 70, the button 32 does not contact the knife blade structure. While the offset between the knife blade structure 70 and the button 32 in the embodiment shown is brought about by the apex 74 of the knife blade structure 70 being positioned off center, the same result can be accomplished by positioning the button 32 and button retainer 62 off center with the apex 74 of the knife blade structure 70 being positioned on center.

Referring now specifically to FIGS. 6 and 7, the spring clip button retainer 62 is illustrated in detail. The base member 66 of the retainer 62 includes an upstanding central cylindrical portion 80 connected to an annular flange 82. The outer peripheral end portion of the flange 82 is turned upwardly to form a curved retaining ledge 84 for maintaining the spring 64 in position. As best shown in FIG. 6, the spring 64 is comprised of an elongated resilient member having oppositely positioned end portions formed in U-bends 86 connected together by an intermediate portion 88 retained by the ledge 84 of the base 66. The innermost legs 84 of the U-bends 86 extend through side openings 90 in the cylindrical portion 80 of the base 66 whereby the enlarged knob portion 38 of the button 32 is retained within the interior of the cylindrical portion 80 by the legs 85. As will be understood, the strength of the spring 64 and size of the button 32 are coordinated such that when a predetermined downward force is exerted on the button 32, the legs 85 of the spring 64 are forced apart and the button 32 is released as shown in FIG. 8.

In the assembly of the structure 10, the flexible sealing member 22, the perforated protection member 24 and the perforated rupture member 26 are positioned together in nesting relationship and the button 32 attached to the sealing member 22 is positioned whereby it extends through the opening 60 in the rupture member 26 and is engaged and retained by the spring clip button retainer 62. The sealing member 22, protection member 24 and rupture member 26 are then sealingly clamped between the support members 12 and 14 whereby the knife blade structure 70 is positioned on the side of the sealing member 22 opposite the protection member 24 and rupture member 26. The support members 12 and 14 of the assembly 10 are of complementary sizes and shapes such that after the assembly is clamped together by means of the recessed bolts 16 thereof, it can be positioned and sealingly clamped between conventional pipe flanges or the like.

The assembly 10 is orientated within the pipe flanges whereby pressure from a first pressure zone is communicated by way of the support member 12 to the convex side of the sealing member 22, and fluid pressure from a second pressure zone is communicated by way of the support member 14, the openings and slits in the rupture member 26 and the openings and slits in the protection member 24 to the convex side of the sealing member 22.

In operation of the assembly 10, when a positive pressure differential is exerted across the flexible sealing member 22, the dome-shaped portion 28 thereof is deformed into contact with the protection member 24 which contacts the rupture member 26. The pressure differential is thus exerted across the sealing member 22 and rupture member 26, and when the predetermined positive pressure differential at which the assembly 10 is designed to rupture is reached, the force exerted on the sealing member and rupture member (from the first pressure zone to the second pressure zone) causes the rupture member 26 to tear between the apertures 52 thereof. The rupture of the rupture member 26 causes the flexible sealing member 22 to also rupture whereby the pressure differential is relieved through the assembly 10. The flow of the fluid being relieved through the assembly 10 causes the sealing member 22, protection member 24 and rupture member 26 to fold outwardly in sector-shaped parts as illustrated in FIG. 5. Also, as shown, the button retainer 62 remains attached to one of the sector-shaped parts.

Figure 9:
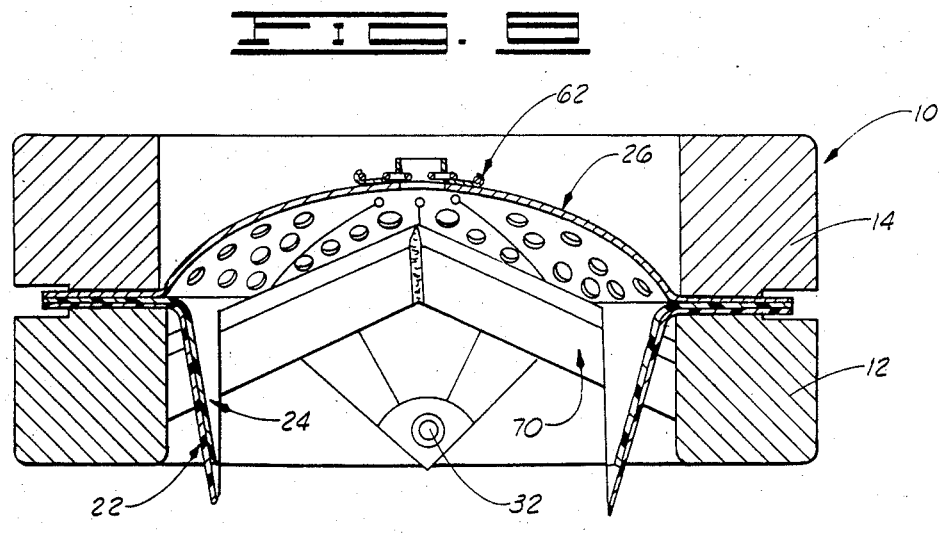
FIG. 9 is a cross-sectional view similar to FIG. 2 but showing the assembly after rupture as a result of negative pressure differential.

When a negative pressure differential is exerted across the flexible sealing member 22 of the assembly 10, the sealing member 22 is deformed towards the knife blade structure 70, but is prevented from contacting the knife blade structure as long as the button 32 connected to the sealing member is retained by the button retainer 62. When the predetermined negative pressure differential at which the assembly is designed to rupture is reached, the force exerted on the sealing member 22 and on the button 32 overcomes the ability of the spring 64 of the button retainer 62 to retain the button 32 and the button is pulled therefrom. This in turn causes the sealing member 22 to be severed by the knife structure 70 and to open in sector-shaped parts as illustrated in FIG. 9.

As will be understood, under conditions where positive pressure differential relief is unnecessary, a suitable perforated member (not shown) can be substituted for the rupture member 26 to support the button retainer 62 or other retainer means. The operation of such a modified assembly for relieving negative pressure differential would be the same as described above.

The release of the button 32 from the button retainer 62 occurs suddenly when the predetermined negative pressure differential is reached. Such sudden release causes the sealing member 22 to impact the knife structure 70 with considerable force whereby full severing and opening of the sealing member 22 occurs even when the negative pressure differential is very low.

Because the button 32 and button retainer means 62 are positioned on the side of the assembly 10 opposite the side normally in communication with a vessel being protected, the assembly 10 is easily cleaned from inside the vessel without the need for removing it. This is particularly advantageous in food industry applications.

In carrying out the method of the present invention for relieving a predetermined negative pressure differential between zones, a rupture disk assembly is sealingly placed between the zones. The assembly is comprised of a flexible sealing member, a retainer means positioned on one side of the sealing member for engagement with the sealing member until disengaged therefrom by a predetermined negative pressure differential exerted across the sealing member, and a knife means for severing the sealing member positioned on the other side of the sealing member. The sealing member is engaged with the retainer means whereby the sealing member is retained and prevented from contacting the knife means until the predetermined negative pressure differential is reached.

In carrying out the method of the present invention for bidirectionally relieving predetermined positive and negative pressure differentials between first and second pressure zones, a rupture disk assembly is sealingly placed between the zones. The assembly is comprised of a flexible sealing member including a connector on one side thereof, a perforated rupture member for rupturing when a predetermined positive pressure differential is exerted thereacross and across the sealing member positioned adjacent the sealing member on the side thereof containing the connector, retainer means attached to the rupture member for retaining the connector until disconnected therefrom by a predetermined negative pressure differential exerted across the sealing member, and knife means for severing the sealing member positioned adjacent the other side of the sealing member. The connector of the sealing member is connected to the retainer means whereby the sealing member is retained and prevented from contacting the knife means until the predetermined negative pressure differential is reached.

When a positive pressure differential is exerted across the sealing member and rupture member of a magnitude equal to the predetermined positive pressure differential at which the rupture disk assembly is designed to rupture, the rupture member and sealing member rupture and the positive pressure is relieved by the flow of pressurized fluid through the rupture disk assembly. When a negative pressure differential is exerted across the rupture disk assembly of a magnitude equal to the predetermined negative pressure differential for which the assembly is designed to rupture, the connector is pulled from the retainer means and the sealing member is severed by the knife means whereby negative pressure differential is relieved by the reverse flow of fluid through the assembly.

Thus, the present invention is well adapted to carry out the objects and attain the ends and advantages mentioned as well as those inherent therein. While presently preferred embodiments of the invention have been described for purposes of this disclosure, numerous changes in the arrangement and construction of parts will suggest themselves to those skilled in the art. Such changes are encompassed within the spirit of this invention as defined by the appended claims.

What is claimed is:

1. A rupture disk assembly adapted to be clamped in a pressure relief area for relieving fluid pressure at a predetermined negative pressure differential comprising:
    a flexible sealing member;
    a retainer means positioned adjacent one side of said sealing member for engagement with and retention of said sealing member until disengaged therefrom when a predetermined negative pressure differential is exerted across said sealing member; and
    knife means for severing said sealing member positioned adjacent the side of said sealing member opposite said retainer means and spaced therefrom whereby said sealing member is prevented from contacting said knife means until disengaged from said retainer means.

2. The assembly of claim 1 wherein said retainer means is comprised of a spring clip retainer and said flexible sealing member includes a button connector attached thereto for engagement therewith.

3. A rupture disk assembly adapted to be clamped in a pressure relief area for relieving fluid pressure at predetermined positive and negative pressure differentials comprising:
    a flexible sealing member;
    a perforated rupture member positioned adjacent one side of said sealing member for rupture when a predetermined positive pressure differential is exerted thereacross and across said sealing member;
    a retainer means attached to said rupture member for engagement with and retention of said sealing member until disengaged therefrom when a predetermined negative pressure differential is exerted across said sealing member; and
    knife means for severing said sealing member positioned adjacent the side of said sealing member opposite said rupture member and spaced therefrom whereby said sealing member is prevented from contacting said knife means until said sealing member is disengaged from said retainer means.

4. The assembly of claim 3 wherein said perforated rupture member includes slits formed therein which radiate outwardly from a central portion and terminate in spaced relation to the periphery thereof whereby sectors are defined in said rupture member, each of such sectors including a plurality of openings therein.

5. The assembly of claim 4 wherein said retainer means is attached to said rupture member at a single point within one of said sectors.

6. The assembly of claim 4 wherein said retainer means is a spring clip retainer.

7. The assembly of claim 3 wherein said rupture member and sealing member are dome-shaped with the convex side of said sealing member positioned adjacent the concave side of said rupture member.

8. A bidirectional rupture disk assembly adapted to be clamped in a pressure relief area for relieving fluid pressure at predetermined positive and negative pressure differentials comprising:
    a flexible sealing member including a connector on one side thereof;
    a perforated rupture member positioned adjacent the side of said sealing member containing said connector for rupture when a predetermined positive pressure differential is exerted thereacross and across said sealing member;
    a retainer means attached to said rupture member for engagement with and retention of said sealing member connector until disconnected therefrom when a predetermined negative pressure differential is exerted across said sealing member; and
    knife means for severing said sealing member positioned adjacent the side of said sealing member opposite said rupture member and spaced therefrom whereby said sealing member is prevented from contacting said knife means until said connector is disconnected from said button retainer means.

9. The assembly of claim 8 wherein said perforated rupture member includes slits formed therein which radiate outwardly from a central portion and terminate in spaced relation to the periphery thereof whereby sectors are defined in said rupture member, each of such sectors including a plurality of openings therein.

10. The assembly of claim 9 wherein said retainer means is attached to said rupture member at a single point within one of said sectors.

11. The assembly of claim 9 wherein said retainer means is a spring clip retainer.

12. The assembly of claim 11 wherein said central portion of said rupture member includes a center opening therein, said spring clip button retainer is attached to the side of said rupture member opposite said sealing member over said center opening and said connector attached to said sealing member extends through said center opening in said rupture member into engagement with said spring clip retainer.

13. The assembly of claim 11 which is further characterized to include a perforated protection member positioned between said rupture member and said sealing member in covering relationship to said slits and openings therein to protect said sealing member from premature failure due to abrasion and cutting on the edges of said slits and openings.

14. The assembly of claim 8 wherein said rupture member and sealing member are dome-shaped with the convex side of said sealing member positioned adjacent the concave side of said rupture member.

15. A bidirectional rupture disk assembly adapted to be clamped between bolted pipe flanges or the like for relieving fluid pressure at predetermined positive and negative pressure differentials comprising:

a flexible sealing member having a dome-shaped portion connected to an annular flat flange portion and having a retaining button attached to the dome-shaped portion on the convex side thereof;

a rupture member for rupturing when a predetermined positive pressure differential is exerted thereacross and across said sealing member having a dome-shaped portion connected to an annular flat flange portion and positioned adjacent said sealing member with the concave side of said rupture member facing the convex side of said sealing member, said rupture member having slits formed therein which radiate outwardly from a central portion and terminate in spaced relation to the periphery of said dome-shaped portion defining sectors therein, each of such sectors including a plurality of openings therein and said central portion of said rupture member including a center opening therein;

a button retainer means positioned adjacent said central portion of said rupture member over said center opening therein and attached to said rupture member on the side thereof opposite said sealing member at a single point within one of said sectors, said button retainer means engaging and retaining said button when extended through said center opening until pulled therefrom when a predetermined negative pressure differential is exerted across said sealing member;

a pair of support members adapted to be supported between pipe flanges or the like including annular surfaces between which the annular flat flange portions of said sealing member and rupture member are positioned; and knife blade means for severing said sealing member attached to the support member positioned on the concave side of said sealing member, said knife blade means being spaced from said sealing member whereby said sealing member is prevented from contacting said knife blade means until said button is pulled from said button retainer means.

16. The assembly of claim 15 wherein said button retainer means is a spring clip button retainer.

17. The assembly of claim 16 which is further characterized to include a perforated protection member having a dome-shaped portion connected to an annular flat flange portion positioned between said rupture member and said sealing member in covering relationship to said slits and openings in said rupture member to protect said sealing member from premature failure due to abrasion and cutting on the edges of said slits and openings.

18. The assembly of claim 17 wherein said knife blade means are comprised of three radially extending blade members the inner ends of which are connected together with the outer ends attached to said support member.

19. The assembly of claim 18 wherein said support members are bolted together whereby said annular flat flange portions of said sealing member, rupture member and protection member are forceably clamped therebetween.

20. A method of bidirectionally relieving predetermined positive and negative pressure differentials between first and second zones comprising the steps of:

sealingly placing a rupture disk assembly between said zones comprised of a flexible sealing member, a retainer means positioned on one side of said sealing member for retaining said sealing member until disengaged therefrom by a predetermined negative pressure differential exerted across said sealing member, and knife means for severing said sealing member positioned adjacent the other side of said sealing member; and engaging said sealing member with said retainer means whereby said sealing member is retained and prevented from contacting with said knife means until said predetermined negative pressure differential is reached.

21. The method of claim 20 wherein said retainer means is comprised of a spring clip retainer and said sealing member includes a button connector attached thereto for engagement therewith.

22. A method of bidirectionally relieving predetermined positive and negative pressure differentials between first and second zones comprising the steps of:

sealingly placing a rupture disk assembly between said zones comprised of a flexible sealing member including a connector on one side thereof, a perforated rupture member for rupturing when a predetermined positive pressure differential is exerted thereacross and across said sealing member positioned adjacent said sealing member on the side thereof containing said connector, a retainer means attached to said rupture member for retaining said connector until disconnected therefrom by a predetermined negative pressure differential exerted across said sealing member, and knife means for severing said sealing member positioned adjacent the other side of said sealing member; and connecting said connector of said sealing member to said retainer attached to said rupture member whereby said sealing member is retained and prevented from contacting with said knife means until said predetermined negative pressure differential is reached.

23. The method of claim 22 wherein said rupture member has slits formed therein which radiate outwardly from a central portion and terminate in spaced relationship to the periphery thereof defining sectors therein, each of said sectors including a plurality of openings therein and said button retainer means being attached to said rupture member at a single point within one of said sectors adjacent said central portion of said rupture member.

24. The method of claim 23 wherein said rupture member and sealing member are dome-shaped and the convex side of said sealing member is positioned adjacent the concave side of said rupture member.

25. The method of claim 24 wherein said retainer means is a spring clip retainer.

26. The method of claim 25 wherein said rupture member has a center opening disposed within said central portion thereof, said spring clip retainer is attached to the side of said rupture member opposite said sealing member over said center opening and said connector of said sealing member extends through said center opening in said rupture member into engagement with said spring clip retainer.

27. The method of claim 26 wherein said rupture disk assembly is further characterized to include a perforated protection member positioned between said rupture member and said sealing member in covering relationship to said slits and openings in said rupture member to protect said sealing member from premature failure due to abrasion and cutting on the edges of said slits and openings.

28. The method of claim 27 wherein said rupture disk assembly is further characterized to include a pair of support members between which the sealing member, rupture member and protection member are clamped.

29. The method of claim 28 wherein said knife means of said rupture disk assembly are comprised of three radially extending blade members, the inner ends of which are connected together with the outer ends attached to one of said support members.

* * * * *